July 14, 1936. M. A. LISSMAN 2,047,568
METHOD AND APPARATUS FOR SEPARATING SUSPENDED PARTICLES FROM GASES
Filed July 8, 1935 3 Sheets-Sheet 1

INVENTOR
Marcel A. Lissman
BY
ATTORNEYS

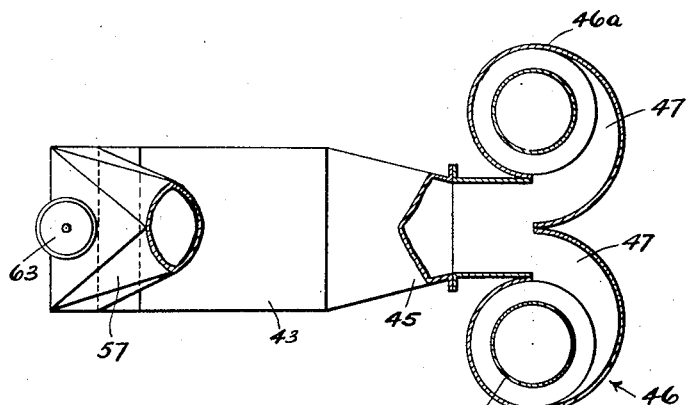
Fig. 7
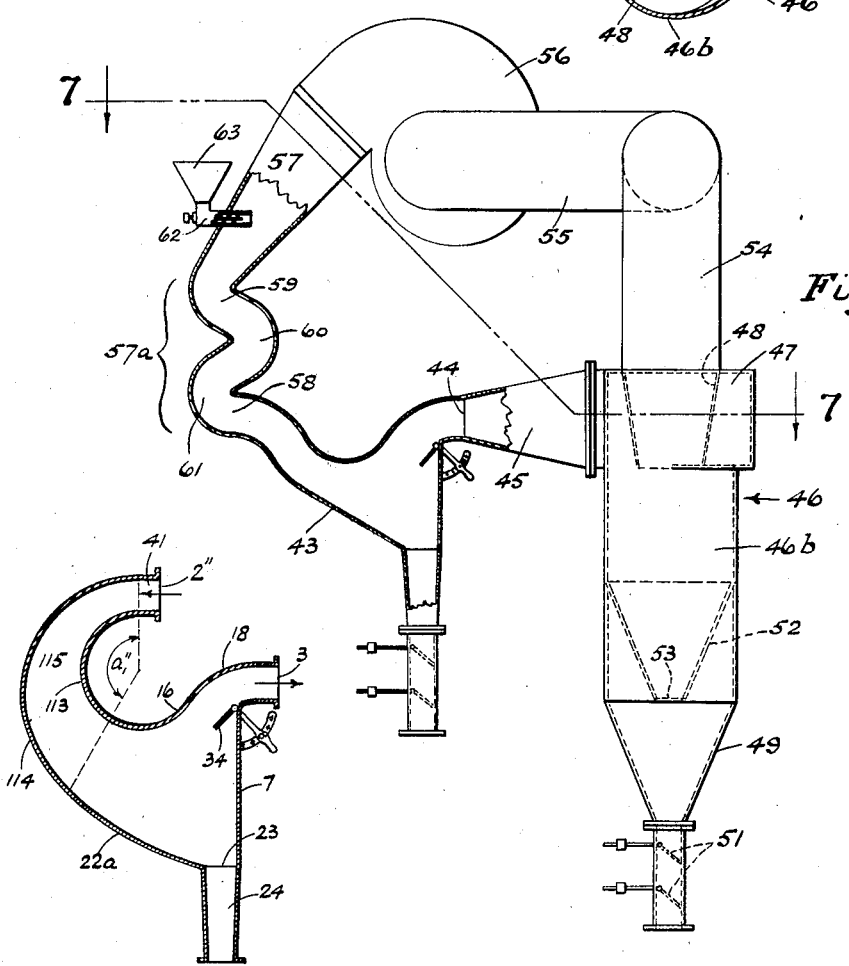
Fig. 6
Fig. 5a.

July 14, 1936.  M. A. LISSMAN  2,047,568
METHOD AND APPARATUS FOR SEPARATING SUSPENDED PARTICLES FROM GASES
Filed July 8, 1935   3 Sheets-Sheet 3

INVENTOR.
Marcel A. Lissman
BY
ATTORNEYS.

Patented July 14, 1936

2,047,568

UNITED STATES PATENT OFFICE 2,047,568

METHOD AND APPARATUS FOR SEPARATING SUSPENDED PARTICLES FROM GASES

Marcel A. Lissman, Moorestown, N. J., assignor to International Precipitation Company, Los Angeles, Calif., a corporation of California Application July 8, 1935, Serial No. 30,223

8 Claims. (Cl. 183—75)

This invention relates to the separation of suspended particles from gases, and particularly to a method and apparatus in which a stream of gas containing suspended particles, such as dust, is introduced into a separating chamber at high velocity so as to impart to the suspended particles a certain momentum dependent upon the mass and velocity thereof, and in which the gas stream is deflected and withdrawn from said chamber, while the suspended particles are more or less completely carried forward by their momentum and by the action of centrifugal force, out of the main gas stream, and are collected. An impact surface is provided, in the path of the suspended particles which are carried forward out of the main gas stream, and the separating chamber is so constructed as to provide a relatively quiescent zone adjacent said impact surface. The collection of the suspended particles is effected, in large part at least, by causing said particles to strike said impact surface, whence they are deflected or fall by gravity into a suitably disposed collecting space.

The invention may be utilized either for the purpose of "dust collection", that is, to simply remove and collect a substantial proportion of the suspended particles carried by a gas stream, or for the purpose of "classification", that is, to separate and collect a relatively large proportion of "coarse" particles from a gas stream while leaving in the gas stream a relatively large proportion of "fine" particles which may, if desired, be subsequently separated and collected in any suitable manner, so as to effect a classification of the original suspended material into two portions, one of which consists largely of "coarse" particles with a relatively small proportion of fine material, and the other of which consists largely of "fine" particles with a relatively small proportion of coarse material.

The principal object of this invention is to provide a separating method and apparatus of the general type above mentioned, in which the gas stream is caused to follow a certain definite flow path through the separating chamber, with a relatively small amount of turbulence or eddying, and with a highly efficient separation and collection of the suspended particles or the relatively coarse fractions thereof.

A further object of this invention is to provide an apparatus which will effectively separate and collect particles suspended in a gas, and which is simple and inexpensive in construction and operation.

A further object of the invention is to provide for efficient "collection" or "classification" of the suspended material, with a minimized accompanying pressure drop or draft loss.

When the invention is utilized for the purpose of "classification", it is a further object of the invention to provide a relatively great uniformity and sharpness of selective separation of coarse particles from fine particles carried by the gas.

Further objects of the invention will be pointed out hereinafter or will be apparent from the following description:

The accompanying drawings illustrate several different forms of apparatus according to this invention, and referring thereto:

Figs. 5 and 5a are longitudinal vertical sections of forms of apparatus adapted particularly for the separation and collection of dust particles.

Fig. 6 is a partly sectional side elevation of a form of classifying apparatus having means for feeding divided material to be classified into a circulated gas stream, and provided with means according to this invention for separating and collecting coarse material from said gas stream, and with an associated dust collecting apparatus for subsequently removing and collecting the fine material.

Fig. 7 is a horizontal section on lines 7—7 in Fig. 6.

Figure 2:
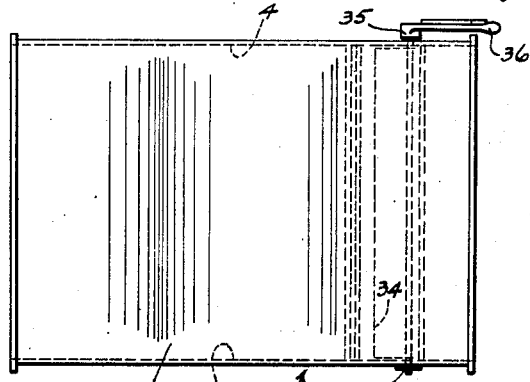
Fig. 2 is a plan view thereof.
Figure 1:
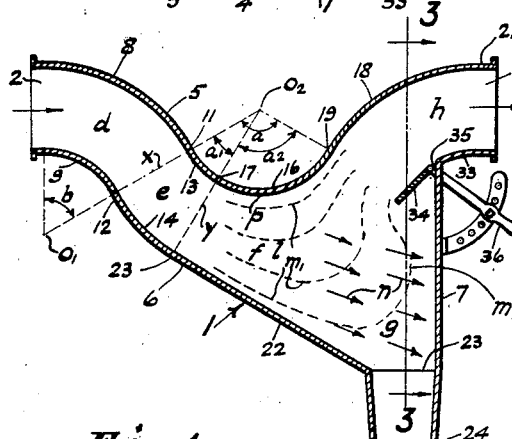
Fig. 1 is a longitudinal vertical section of an apparatus particularly adapted for separation of coarse material, from a gas stream carrying both coarse and fine particles in suspension.
Figure 3:
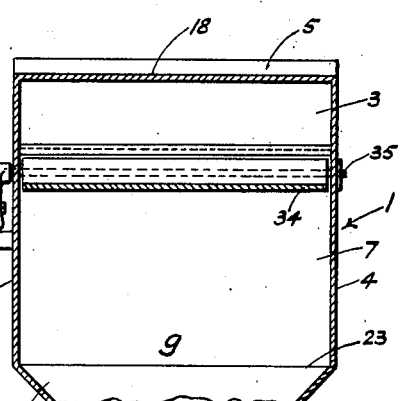
Fig. 3 is a partial transverse section on line 3—3 in Fig. 1.

The apparatus shown in Figs. 1, 2 and 3 is designed particularly for use in the separation of relatively coarse particles from fine particles carried in suspension in a gas stream. The apparatus comprises a separating chamber 1 provided with an inlet opening 2 at one end and an outlet opening 3 at the other end, said chamber having side walls 4, a top wall 5, a bottom wall 6, and an end wall 7 at the end adjacent the outlet opening. Side walls are shown as extending substantially vertically and parallel to one another, but it will be understood that these walls may depart somewhat from vertical position if desired, and that they are not necessarily equally spaced from one another throughout their length from the inlet to the outlet end. End wall 7 is also shown as vertical, but may, if desired be inclined somewhat from that position.

Starting at the end of the chamber adjacent the inlet opening 2, the top and bottom walls are provided with curved portions 8 and 9 respectively, which cooperate to define a preliminary deflecting passage $d$, continually curved in one direction. In the example shown, the wall portions 8 and 9 are curved forwardly and downwardly with a forwardly increasing downward slope, and these portions are also shown as substantially equally spaced from one another throughout the length of the continually curved gas deflecting passage defined therebetween, that is, throughout the angle indicated at $b$. The angle $b$ should not be less than 30°, and in the example shown, this angle is approximately 60°. In Fig. 1, the wall portions 8 and 9 are of arcuate shape, having a common axis of curvature indicated at $o_1$, but it will be understood that these portions are not necessarily of circular curvature, and that the axes of curvature thereof do not necessarily coincide with one another. The wall portions 8 and 9, having the curvature above described, terminate at the points indicated at 11 and 12, respectively.

Said top and bottom walls are next provided with portions 13 and 14 respectively, which are continually curved in the opposite direction to the curvature of wall portions 8 and 9, so as to define a curved gas deflecting passage $e$ extending from the position indicated by the dotted line $x$ to the position indicated by the dotted line $y$, whose curvature is reversed with respect to the curvature of the preliminary gas deflecting passage $d$ defined by the wall portions 8 and 9. The portions 8 and 13 of the top wall 5 are shown as meeting one another substantially tangentially at 11, while the portions 9 and 14 of the bottom wall 6 are shown as meeting one another substantially tangentially at 12. The wall portions 13 and 14 are of forwardly decreasing downward inclination, and are shown as being of arcuate shape, having a common axis of curvature indicated at $o_2$. It will be understood, however, that these wall portions are not necessarily of circular curvature, and that the axes of curvature thereof do not necessarily coincide. These wall portions 13 and 14 are shown as extending through an angle indicated at $a_1$. This angle is shown in Fig. 1 as being approximately 30°, but is subject to considerable variation, as shown hereinafter.

The top wall 5 is next provided with a portion 16 which is continually curved in the same direction as the portion 13, meeting said portion 13 substantially tangentially at the position indicated at 17. The portion 16 is also shown as arcuate in shape, having its axis of curvature also located at $o_2$, so that the wall portions 13 and 16 actually form a continuous arcuate section extending through the angle indicated at $a$. The portions 13 and 16, however, may advantageously be considered separately, due to the different shapes of the portions of the lower wall 6 which extend opposite these respective portions of the top wall. The portion 16 extends through an angle indicated at $a_2$. This angle should be at least 60°, and it is shown in Fig. 1 as being approximately 90°. It will be understood that the wall portion 16 is also not necessarily of circular curvature, and that the axis of curvature thereof, if circular, does not necessarily coincide with the axis of curvature of the wall portion 13. The wall portion 16 is of forwardly decreasing downward inclination, until it becomes horizontal, at the position indicated at $p$, beyond which it is of forwardly increasing upward inclination.

The top wall 5 is next provided with a portion 18, which is preferably curved in the reverse direction to the wall portion 16, said portions meeting substantially tangentially at the position indicated at 19. Said portion 18 is of forwardly decreasing upward slope, and terminates in a short horizontal portion 21 adjacent the outlet opening 3. This portion of the top wall is also shown as arcuate in shape, but it will be understood that it is not necessarily of circular curvature. In fact, this portion may, if desired, extend substantially straight in a direction approximately tangential to the curved portion 16 at the point 19, the chief purpose in adopting the curved shape illustrated being to provide a substantially horizontally directed gas outlet opening.

The bottom wall 6 is provided with a downwardly inclined portion 22, which meets the curved portion 14 substantially tangentially at the position indicated at 23. This inclined portion 22 is shown as sloping downwardly at an angle of approximately 30° in the direction of gas flow, but the angle of inclination thereof may be varied considerably. It will be seen that the portions 16 and 22 of the top and bottom walls cooperate to define therebetween a gas expanding passage $f$, in which the height, and consequently the cross-sectional area, continually increases in the direction of flow of the gas, so as to provide a gradual decrease in gas velocity in this portion of the separating chamber.

The separating chamber is also provided with an opening 23 through which separated material may be discharged, said opening being disposed between the lower ends of end wall 7 and the inclined bottom wall portion 22, and preferably extending throughout substantially the entire width of the chamber between the side walls 4. The end wall 7 and bottom wall portion 22 cooperate to define a hopper-shaped space $g$, in which suspended particles are separated from the gas stream as hereinafter described, after which said particles fall by gravity through the opening 23. A discharge spout 24 extends downwardly from the opening 23 and provides a collecting space for separated material, and any suitable means may be provided for permitting discharge of separated material through said spout while substantially preventing flow of gas therethrough. As an example of means which may be employed for this purpose, I have shown a rectangular casing 25 connected to the lower end of said discharge spout and provided with two gates 26 and 27, pivotally mounted at 28 and 29, and having weighted lever arms 31 and 32, said gates being successively operated by accumulation of separated material thereon in sufficient amount to tilt said gates against the action of the weighted arms, so as to permit discharge of separated material by gravity, while one of said gates is at all times in closed position so as to maintain an effective gas seal.

From the upper end of end wall 7, a short bottom wall portion 33 extends to the outlet opening 3, said portion 33 being preferably shown as equally spaced throughout its length from the top wall portions 18 and 21. A baffle member 34 is preferably provided, projecting from the upper edge of end wall 7 into the interior of the separating chamber, and preferably inclined in a direction more or less generally parallel to the opposing portion of the top wall. A gas discharge passage $h$ is thus provided between baffle member 34 and lower wall portion 33, and the top wall portions 18 and 21. The walls of said gas discharge passage may be of any suitable shape, to conduct the gas to an outlet opening 3 of any desired size or shape. The baffle member 34 may advantageously be pivotally mounted at its upper edge, as indicated at 35, and may be provided with an adjusting arm 36 disposed outside the separating chamber, whereby said baffle member may be angularly adjusted and secured in the most advantageous position.

In the operation of the above described apparatus, the gas carrying suspended solid particles, including both relatively coarse and relatively fine material, is introduced at suitable velocity through inlet opening 2. In passing through the preliminary deflecting passage $d$, the inertia of the suspended particles tends to drive such particles toward the outer or upper portion of the gas stream, so that when the gas stream reaches the position indicated at $x$, those particles which have sufficient inertia to overcome the deflecting force of the gas are largely concentrated in the upper portion of the gas stream, it having been found that a somewhat more complete separation between coarse and fine particles may be obtained by effecting such a preliminary concentration, than is obtained if the suspended particles are substantially uniformly distributed throughout the cross-section of the gas stream at the start of the main separating operation, as at $x$. This improved efficiency of separation is probably due principally to the fact that substantially all the particles which are of sufficient size to be separated by inertia in the main classification zone are concentrated in an upper layer of the gas stream at the position $x$, so that all of these particles are subjected to a relatively uniform classifying operation in said classifying zone, while particles which are of insufficient size to be displaced sufficiently to reach the upper portion of the gas stream at the position $x$, will not have sufficient inertia to penetrate or re-cross the stream lines of the gas flow at the reduced velocity prevailing in the main classifying zone, and will therefore be carried along with the main gas stream and be discharged therewith through the passage $h$. Furthermore, I have found that the fine particles tend to adhere to the surface of the coarser particles, and by concentrating the coarse particles in the upper part of the gas stream and then causing the particles to be carried by inertia forwardly and downwardly while deflecting the gas stream upwardly, as described below, the coarse particles are caused to pass through or across the gas stream and the gas friction tends to dislodge therefrom adherent fine particles, which are carried along with the outgoing gas stream.

The gas stream then enters the deflecting passage $e$, wherein it moves in a path curved in the reverse direction to its motion in the preliminary deflecting passage $d$. As the gas moves in this curved path, the relatively coarse particles acquire a considerable momentum in a forwardly and downwardly inclined direction, and are thereby carried toward the lower portion of the gas stream. Upon passing through the gas expanding passage $f$, the gas continues to be deflected in the same direction, while gradually expanding and losing velocity, as indicated by the dotted lines at $m_1$, while the momentum of the coarser particles continues to drive these particles toward the lower or outer portion of the gas stream. Particles exceeding a certain size or weight are therefore carried by their momentum, in the general direction indicated by the arrows at $n$, toward and upon the inner surface of the end wall 7, which extends transverse to the direction of movement of said particles and acts as an impact surface against which said particles are caused to strike, and said particles are thus either deflected or fall by gravity downwardly through the dust discharge opening 23. As is diagrammatically illustrated by the relatively wide spacing between the dotted lines indicating the general direction of gas flow at the region indicated at $m_2$, in which this separation of the coarse particles takes place, the velocity of the gas in this region is relatively low, so that the velocity of the gas in passing upwardly toward the gas discharge passage $h$, is insufficient to carry with it these relatively coarse particles, due to the relatively large inertia of said particles.

Upon approaching the position of the lower edge of baffle member 34, and after the relatively coarse particles have been removed from suspension in the main body of the gas stream, the gas stream contracts and gains substantially its original velocity. This gas, still carrying in suspension the relatively fine particles, then passes through the discharge passage $h$ to the outlet opening 3. The baffle member 34 serves to prevent the main gas stream from approaching too close to the impact surface of end wall 7, thereby maintaining a relatively quiescent zone adjacent said impact surface and in the lower portion of the hopper shaped space $g$, in which the separated coarse particles are permitted to fall by gravity into the discharge spout 24, from which they are discharged through the discharge means above described. Baffle member 34 also serves to prevent the coarse particles which strike the impact surface of end wall 7 from being carried upwardly past the upper edge of this surface and into the gas discharge passage $h$.

It will be understood that the flow of gas through the apparatus may be maintained by any suitable draft producing agency, a fan or blower being ordinarily provided, either at the inlet or outlet side of the apparatus, for maintaining such flow of gas at the desired velocity. In some cases, however, the flow of gas may be produced by natural draft.

The gas velocity through the apparatus is preferably maintained relatively high, as I have found that, within the limits of ordinary commercial operation, an increase in the gas velocity serves to provide a more effective separation between the coarse and fine particles, in addition to producing classification at a coarser particle size. The velocity remains substantially constant until reaching the position indicated by the dotted line $y$, after which the velocity gradually decreases and then again increases until the velocity in the gas discharge passage $h$ is again approximately the same as at the inlet.

As a specific illustration of the more effective separation between coarse and fine particles obtained at high velocity, the following results are given for inlet velocities of approximately 30 ft.

per second and approximately 50 ft. per second, as determined by actual operation in a commercial apparatus. The material carried in suspension in the gas stream was a mixture of fine stone dust, with a relatively small proportion of coarse particles, arising from a crushed stone drying and cleaning apparatus. After passing through a classifier of the type above described, to separate coarse material, the gas was then passed through a centrifugal dust collecting apparatus adapted to collect a relatively high proportion of the fine suspended material. The ratio between the total weight of "coarse" material collected in the classifier and "fine" material collected in the dust collector was approximately 1 to 16. The figures given below represent the screen analyses of the "coarse" fraction collected in the classifying apparatus and the "fine" fraction collected in the centrifugal dust collector, at the approximate gas velocity given above:

| Screen analysis | 30 feet per second | | 50 feet per second | |
| --- | --- | --- | --- | --- |
| | Coarse fraction | Fine fraction | Coarse fraction | Fine fraction |
| Percent minus 200 mesh | 9.0 | 80.5 | 5.0 | 90.0 |
| Percent minus 100 mesh | 32.5 | 90.0 | 24.0 | 97.0 |
| Percent minus 50 mesh | 82.5 | 99.35 | 76.0 | 99.6 |
| Percent plus 50 mesh | 17.5 | 0.65 | 24.0 | 0.4 |

Figure 4:
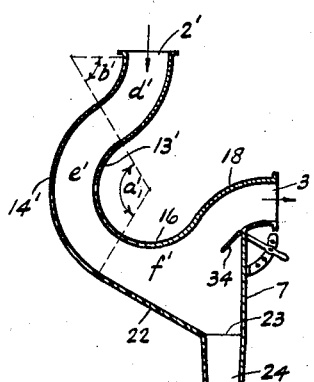
Fig. 4 is a longitudinal vertical section of a somewhat modified form of separating apparatus.

A somewhat modified form of classifying apparatus is shown in Fig. 4, in which the gas deflecting passage $e'$ defined between the continuously curved opposing wall portions $13'$ and $14'$ extends through a somewhat greater angle than before, as shown at $a_1'$. This angle is shown in this case as being approximately 120° so as to cause the gas to travel in a continuously curved path of somewhat greater length than in the previously described form of the invention, before entering the gas expanding portion $f'$. The gas deflecting passage $e'$ is connected to inlet opening $2'$ by preliminary deflecting passage $d'$, which is curved in the reverse direction to the passage $e'$ and which extends through an angle $b'$, shown as approximately 60°. The inlet opening $2'$ is in this case directed upwardly so as to receive gas delivered to the apparatus in a vertical downward direction. The remainder of the apparatus is substantially the same as in Fig. 1, and the operation of this form of apparatus is similar to that above described, with the exception that the greater angular extent of the deflecting passage $e'$ serves to provide a somewhat greater separating action on the suspended particles, due to the fact that the inertia or centrifugal separating action is exerted for a longer time.

It will be evident that the inlet portion of the apparatus may be adapted for connection to a flue or pipe extending in any direction, either vertically upward or downward, horizontally, or at any other angle. For example, the apparatus shown in Fig. 1 is adapted to be connected directly to a horizontal flue, while that shown in Fig. 4 is adapted to be connected to a flue extending vertically downward. If desired, an apparatus such as shown in Fig. 1 may be connected, by means of a short flue section curving downwardly to the left from the position of the inlet opening 2, to the upper end of a vertical stack or other upwardly directed flue, so that the gas from said stack or flue is delivered through said curved section into the inlet end of the apparatus shown in said figure.

Figure 5:
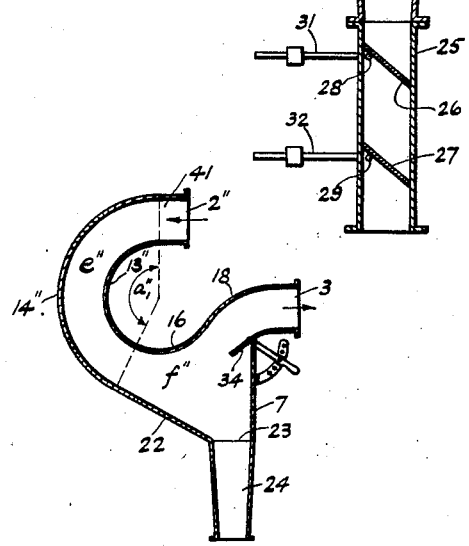

The form of apparatus shown in Fig. 5 is designed particularly for the separation and collection of suspended particles which are of sufficient size and weight to permit separation thereof from a gas stream, by inertia, in an apparatus of this type. This apparatus is also quite similar to that shown in Fig. 1, but the gas deflecting passage $e''$ defined by walls $13''$ and $14''$ is shown as extending through a relatively large angle indicated at $a_1''$. In the embodiment shown, this angle is approximately 150°. The preliminary deflecting portion of reverse curvature, such as shown at $d$ in Fig. 1, is in this case entirely omitted, the gas deflecting passage $e''$ being connected to the inlet opening $2''$ by a short horizontal section 41. In the operation of this apparatus, the relatively great length of travel of the gas in the continuously curved deflecting passage $e''$ provides a relatively large opportunity for removal of suspended particles from the gas stream, by inertia, providing an accumulation of suspended particles in the outer portion of the gas stream and adjacent the outer wall $14''$, and these suspended particles are then carried by inertia, through the gas expanding passage $f''$, and separated from the gas and collected in substantially the same manner as previously described.

A slightly different modification is shown in Fig. 5a, in which the outer wall 114 is of spiral form, gradually diverging from the inner wall 113, so that the gas deflecting passage 115, which corresponds to passage $e''$ in Fig. 5, gradually expands throughout the angle $a_1''$.

In Figs. 6 and 7 I have shown a system in which a classifying apparatus according to the present invention is connected in closed circuit with a centrifugal dust collector, to provide for the separation and collection of relatively coarse and fine fractions of divided material introduced into suspension in a gas stream circulated through said apparatus. The classifier 43 is of substantially the same construction as shown in Fig. 1, and the outlet opening 44 thereof is connected by flue 45 to a centrifugal dust collecting apparatus 46 which is shown as comprising two separating elements 46a and 46b of the so called "cyclone" type. Each of these separating elements is provided at its upper end with tangential gas inlet means 47 connected to flue 45, and is provided at its upper end with a centrally disposed gas outlet pipe 48, and at its lower end with a dust collecting hopper 49 having gate means 51 for discharge of collected material, said gate means being for example of the same type as the gate means 26 and 27 shown in Fig. 1. If desired, each of the separating elements 46a and 46b may be provided with an internal conical baffle member 52 disposed somewhat above the collecting hopper 49, so that the separated material is caused to pass through a central opening 53 at the bottom of said baffle member, into the hopper 49, the baffle member serving to prevent or minimize the circulation of gas within the collecting hopper and thus prevent the collected material from being picked up and carried away by the gas stream passing toward the outlet pipe 48.

The outlet pipes 48 of the centrifugal dust collecting hoppers are connected by flues 54 to a common flue 55, which is connected to the inlet side of a centrifugal fan or blower 56, whose outlet is connected through flue 57 to the inlet opening 58 of the classifying apparatus 43. A feeding device, such as a screw feeder 62, is provided for feeding divided material from a bin or hopper 63, into the flue 57, and delivering such material into suspension in the gas passing through said flue.

Between the point where the material is so introduced, and the inlet opening 58 of the classifying apparatus, I prefer to provide means for promoting thorough dispersion of the divided material in the gas stream. For this purpose, the flue 57 may be provided with a portion 57a, of substantially rectangular cross section and comprising a plurality of sections 59, 60 and 61 of alternately reverse direction of curvature, so that the gas stream is alternately subjected to deflection in reverse directions, which tends to thoroughly disperse the suspended material throughout the gas and cause adherent fine particles to be dislodged from the surfaces of the coarser particles, so that by the time the gas stream reaches the inlet opening 58 of the classifying apparatus, the fine and coarse particles are substantially disassociated from one another and are thus susceptible to effective classification.

In the operation of this apparatus, it will be understood that gas is continually recirculated through the classifier and the centrifugal dust collector, by the fan or blower 56, and that the material to be classified, consisting of a mixture of relatively coarse and relatively fine particles, is continually introduced into suspension therein by the feeding device 61. This material is dispersed in the gas in passing through the dispersing portion 57a, and the relatively coarse particles, together with only a fairly small proportion of fine particles, are separated and collected in the classifying apparatus 43, while the finer particles which remain in suspension in the gas are separated and collected in the centrifugal dust collecting apparatus 46. It will be understood that any suitable type of apparatus capable of collecting fine suspended particles may be used for the collection of the fine fraction, instead of the form of apparatus shown in Figs. 6 and 7. For example; a centrifugal dust collector of the type shown in my United States Patent No. 1,909,184, or in Horne and Lissman United States Patent No. 1,990,943, may be used for this purpose.

The separating apparatus of this invention is adapted to a variety of different uses, among which may be mentioned its use as a dust collector adapted to be connected to the upper end of a stack discharging gas containing suspended solid particles, for the purpose of removing and collecting said suspended particles. I have already mentioned the possibility of connecting the apparatus shown in Fig. 1 to the upper end of a stack, for this purpose. In some cases, however, it is desired that the gas be both supplied to and discharged from the apparatus in a substantially vertical upward direction, so that the apparatus may, for example, be connected at an intermediate level in the height of a stack.

Figure 8:
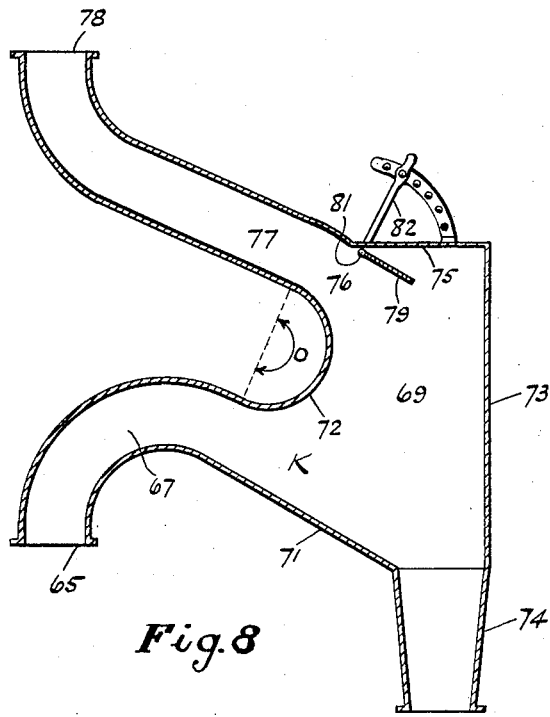
Fig. 8 is a vertical section of a modified form of separating apparatus adapted for use in cases where it is desired to introduce and discharge the gas stream in a substantially vertically upward direction.

A form of apparatus which is especially adapted for this purpose is shown in Fig. 8. This apparatus has a downwardly directed inlet opening 65, at the lower end of a curved gas passage section 67, which is curved through an angle in excess of 90° and opens at its other end into the main separating chamber indicated at 69. The curved section 67 may be of rectangular or any other suitable cross-sectional shape, and it will be understood that, if desired, a gas deflecting passage curved in the reverse direction to the section 67, comparable to that shown at e in Fig. 1, may be provided between said section 67 and the main separating chamber.

The separating chamber 69 is provided with a downwardly inclined bottom portion 71, and a top wall portion 72, the walls 71 and 72 serving to define a gas expanding passage k, comparable to the passage f of Fig. 1, through which the gas enters the separating chamber. Said separating chamber is also provided with an end wall 73 whose inner surface provides an impact surface, against which the particles, separated from the gas stream by the action of momentum or centrifugal force, are caused to strike, in the same manner as described above in connection with the end wall 7 in Fig. 1. The particles thus separated are deflected or caused to fall by gravity into a discharge spout 74, where they are collected. Said discharge spout may be provided with gate means as illustrated in Fig. 1. The upper end of the separating chamber is partially closed by a top wall 75, but a passage 76 is provided between said top wall and the upper end of the curved wall portion 72, through which the gas is discharged into an upwardly inclined outlet passage 77, which terminates in an upwardly directed outlet opening 78. A baffle 79 is provided, adjacent and above the passage 76, and said baffle may be pivotally mounted as at 81 and provided with a lever 82 for angular adjustment thereof.

The wall portion 72 is curved through an angle indicated at o, which is shown as approximately 180°, so that the gas stream is deflected through a considerable angle in passing through the separating chamber, thus providing an effective centrifugal separating action on the suspended particles in said gas stream.

Due to the action of centrifugal force and the momentum of the suspended particles, such particles are thrown or carried forward out of the main gas stream, as the gas follows the curved path through the separating chamber 69, and are caused to strike against the end wall 73 and top wall 75, whence they are deflected or caused to fall by gravity, into the discharge spout 74.

Figure 9:
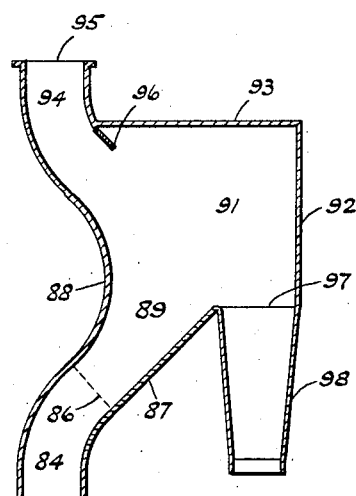
Fig. 9 is a vertical section of another form of apparatus adapted for similar use.

The form of apparatus shown in Fig. 9 is also adapted to be connected to a vertically extending stack, either at the upper end of the stack or at an intermediate level therein. This apparatus comprises a curved gas passage section 84 extending upwardly from an inlet opening 85, the upper end of said section, at the position indicated by the dotted line 86, being inclined upwardly and toward the right at a suitable angle, such as approximately 45 degrees. Beyond this position, the right side wall 87, which is tangent to the right side wall of section 84, is inclined upwardly and toward the right, while the left side wall 88 is arcuate in form and diverges from the wall 87, so as to provide a gas expanding passage 89 between the walls 87 and 88. The main separating chamber 91 is defined between the curved side wall portion 88 and an opposing vertically extending side wall 92, the upper end of said separating chamber being closed by a top wall 93. From the upper left portion of said separating chamber, a curved gas passage section 94 extends upwardly and toward the left, to an upwardly directed outlet opening 95, the left side wall of said section 94 being tangent to the wall portion 88, and the right side wall thereof extending upwardly from the top wall 93. An inwardly projecting baffle member 96 is disposed beneath the left end portion of the top wall 93, at the point where the gas enters the curved outlet section 94, and said baffle may, if desired, be provided with means for angular adjustment thereof, in the same manner as above described.

The lower end of the vertical side wall 92 is spaced from the upper end of the inclined side wall 87, to provide an opening 97, and a discharge spout 98 is disposed below said opening. Said discharge spout may be provided with gate means, such as shown in Fig. 1.

In this form of apparatus the gas follows a curved path through the separating chamber 91, in passing from the curved inlet portion 84 to the outlet portion 94. In the gas expanding passage 89 the velocity of the gas is gradually decreased and the suspended particles are carried by their momentum upwardly and toward the right, and strike against the side wall 92, or against the right portion of the top wall 93, whence they are deflected or caused to fall by gravity, into the discharge spout 98. The reduced velocity of the gas in passing through the separating chamber 91 serves to permit separation and collection of the suspended particles in the manner above described, since the gas at this reduced velocity has a relatively low entraining force on such suspended particles. After the separation of the suspended particles, the gas stream again contracts, and moves with increasing velocity toward the gas outlet passage 94, and then passes through said passage to the upwardly directed outlet opening 95.

It will be observed that in all of the above described forms of apparatus, the wall which defines the outer boundary of the gas stream in the gas expanding passage, such as $f$, extends substantially straight in the general direction in which the suspended particles are carried forward by momentum into the main collecting region. In Figs. 1, 4, 5, 8 and 9, the walls 22, 71 and 87 are shown as actually straight, while in Fig. 5$a$ the wall 22$a$ is shown as slightly curved, forming substantially a continuation of the spiral outer wall 114 of the gas deflecting passage. However, in this latter case the radius of curvature of the wall 22' is sufficiently greater than that of the opposing upper wall portion 16 to provide a gas expanding passage of increasing height therebetween, and is so great that, for all practical purposes, it may also be regarded as "substantially straight". The operation is substantially the same, whether this wall is straight or slightly curved, and it will be understood that either type of construction is within the scope of this invention, and that the corresponding wall in any of the other forms of apparatus, such as the wall 22 in Figs. 1, 4 and 5, may also be slightly curved after the manner shown in Fig. 5$a$, instead of absolutely straight. Also, this wall may, in any of the forms of the invention, be curved slightly in the reverse direction to that shown in Fig. 5$a$, the essential thing being that this wall shall diverge from the opposing wall to provide a gas expanding passage, and that its general direction shall be approximately parallel to the direction in which the suspended particles are carried forward by momentum toward the impact surface, as indicated by the arrows 17 in Fig. 1. The expression "substantially straight" as used in the appended claims, with reference to this wall, will therefore be understood as being sufficiently broad to include a slight curvature in either direction, in accordance with the above considerations.

I claim:

1. In a method of separating relatively coarse particles from a gas stream carrying suspended coarse and fine particles, during passage of said gas stream through a closed chamber, the steps which comprise: causing said gas to travel in a continuously curved flow path to effect a concentration of relatively coarse particles in the outer portion of said gas stream; then causing said gas stream to travel in a flow path of gradually increasing cross-section while partially deflecting said gas stream in a direction of curvature reverse to that of said first-named flow path, so as to impart to said relatively coarse particles a momentum in the general direction of said last-named flow path and to gradually reduce the velocity of the gas stream; then causing the gas stream, while still travelling at reduced velocity, to be further deflected in said last-named direction of curvature; contracting the deflected gas stream to again increase the velocity thereof, and withdrawing said gas stream and entrained relatively fine particles from said chamber, while causing relatively coarse particles to be carried by momentum, forwardly in said general direction and beyond the main path of the gas stream; arresting the relatively coarse particles thus carried forward, by impact against a surface within said chamber extending transverse to said general direction; and collecting the relatively coarse particles thus arrested.

2. An apparatus for separating suspended particles from gases comprising: a closed separating chamber having a wall extending substantially straight in a certain general direction, an opposing wall curved away from said general direction so as to provide between said walls a gas expanding passage, wall portions defining a gas passage arranged to deliver gas in substantially said general direction into the smaller end of said gas expanding passage, wall portions defining a separating space beyond the position of said gas expanding passage and in open communication therewith, said last-named wall portions including a wall providing an impact surface disposed opposite said gas expanding passage and extending transverse to said general direction in position for impact by suspended particles carried by momentum in said general direction through said separating space, and wall portions defining a gas outflow passage communicating with said separating chamber at a position beyond said gas expanding passage and at the same side of said separating chamber as the first mentioned curved wall; means providing a collecting space for separated particles below the position of said impact surface; and a baffle projecting inwardly from said impact surface wall at the end thereof adjacent said gas outflow passage.

3. An apparatus for separating suspended particles from gases comprising: a closed separating chamber having a wall extending substantially straight in a certain general direction and an opposing wall curved away from said general direction so as to provide therebetween a gas expanding passage, a preliminary deflecting section connected to the smaller end of said gas expanding passage for flow of gas therethrough before entering said gas expanding passage, said deflecting section being curved through an angle of at least 30° in the opposite direction to said curved wall of said gas expanding passage, wall portions defining a separating space beyond the position of said gas expanding passage and in open communication therewith, said last-named wall portions including a wall providing an impact surface disposed opposite said gas expanding passage and extending transverse to said general direction of said substantially straight wall in position for impact by suspended particles carried by momentum in said general direction through said separating space, and wall portions defining a gas outflow passage communicating with said separating chamber at a position beyond said gas expanding passage and at the same side of said separating chamber as the first-mentioned curved wall; and means providing a collecting space for separated particles below the position of said impact surface.

4. An apparatus for separating suspended particles from gases comprising: a closed separating chamber having a wall extending substantially straight in a certain general direction and an opposing wall curved away from said general direction so as to provide therebetween a gas expanding passage, a curved gas deflecting section arranged to deliver gas into said gas expanding passage and having inner and outer walls continually curved in the same direction as said curved walls of the gas expanding passage and respectively connected, substantially tangentially, to said curved and substantially straight walls of said gas expanding passage, a preliminary deflecting section arranged to deliver gas into said first-named deflecting section and curved through an angle of at least 30° in the opposite direction, wall portions defining a separating space beyond the position of said gas expanding passage and in open communication therewith, said last-named wall portions including a wall providing an impact surface disposed opposite said gas expanding passage and extending transverse to said general direction of said substantially straight wall in position for impact by suspended particles carried by momentum in said general direction through said separating space, and wall portions defining a gas outflow passage communicating with said separating chamber at a position beyond said gas expanding passage and at the same side of said separating chamber as the first-mentioned curved wall; and means providing a collecting space for separated particles below the position of said impact surface.

5. An apparatus for separating suspended particles from gases comprising: a separating chamber provided at one end with means for introduction of gas and at the other end with a gas outlet opening, said chamber having a curved top wall extending first downwardly from said one end with a forwardly decreasing downward slope until it becomes horizontal, then upwardly with a forwardly increasing upward slope, and then upwardly with a forwardly decreasing upward slope to said gas outlet opening, a downwardly sloping bottom wall cooperating with the downwardly sloping portion and the first mentioned upwardly sloping portion of the top wall to define a gas expanding passage, and a substantially vertical end wall disposed below said gas outlet opening and opposite said sloping bottom wall and cooperating therewith to define a hopper-shaped receptacle for separated material, and said chamber being provided with an outlet opening for separated material at the lower portion of said hopper-shaped receptacle.

6. An apparatus as set forth in claim 5 and comprising, in addition, a baffle projecting inwardly from the upper end of said end wall and below said gas outlet opening.

7. An apparatus for separating suspended particles from gases comprising: a flue portion provided with gas inlet means and having top and bottom walls curved to define a substantially arcuate gas path of forwardly decreasing downward slope; and a separating chamber having one end joining the lower end of said flue portion and provided at its other end with an outlet opening, said chamber having a top wall portion curved through an angle of approximately 90° or more extending first downwardly with a forwardly decreasing downward slope until it becomes horizontal and then upwardly with a forwardly increasing upward slope, and another top wall portion extending upwardly with a forwardly decreasing upward slope from the first named top wall portion to said outlet opening, a substantially straight downwardly sloping bottom wall extending substantially tangential to the bottom wall of said flue portion and opposite said first named top wall portion and cooperating therewith to define a gas expanding passage, and an end wall disposed below said outlet opening and opposite said sloping bottom wall of said chamber and cooperating therewith to define a hopper-shaped receptacle for separated material, and said chamber being provided with an outlet opening for separated material at the lower portion of said hopper-shaped receptacle.

8. A classifying apparatus comprising: a preliminary deflecting section having top and bottom walls curved to define a substantially arcuate gas path of forwardly increasing downward slope; a curved gas passage section joining the lower end of said preliminary deflecting section and having top and bottom walls curved to define a substantially arcuate gas path of forwardly decreasing downward slope, the curved top and bottom walls of said last-named section being substantially tangential to the top and bottom walls of said first-named section at the point of juncture thereof; and a separating chamber having one end joining the lower end of said last-named section and provided at its other end with an outlet opening, said chamber having a top wall portion curved through an angle of about 90° or more and extending first downwardly with a forwardly decreasing downward slope until it becomes horizontal and then upwardly with a forwardly increasing upward slope, and another top wall extending upwardly with a forwardly decreasing upward slope from the first-named top wall portion to said outlet opening, a substantially straight downwardly sloping bottom wall extending substantially tangential to the bottom wall of said last-named gas passage section, and opposite said first-named top wall portion and cooperating therewith to define a gas expanding passage and an end wall disposed below said outlet opening and opposite said sloping bottom wall of said chamber and cooperating therewith to define a hopper-shaped receptacle for separated material, and said chamber being provided with an outlet opening for separated material at the lower portion of said hopper-shaped receptacle.

MARCEL A. LISSMAN.